Feb. 1, 1927.
W. A. CALLOWAY
1,616,110
OPERATING MECHANISM FOR BLEED COCKS
Filed June 10, 1926   2 Sheets-Sheet 1
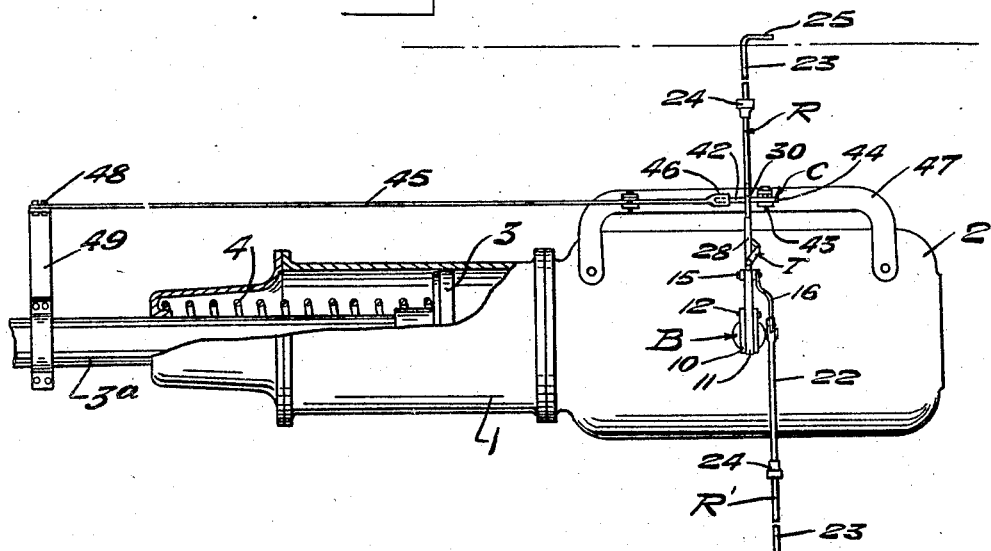
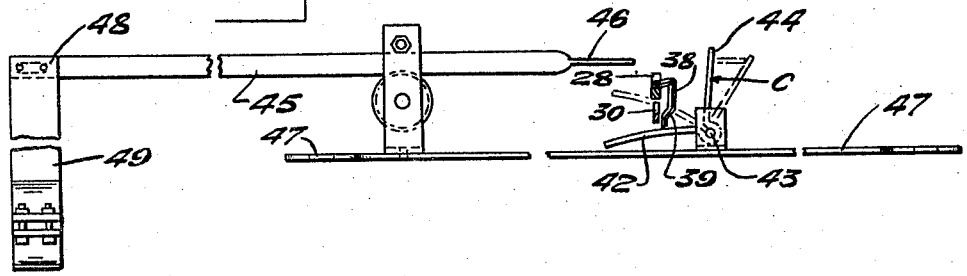
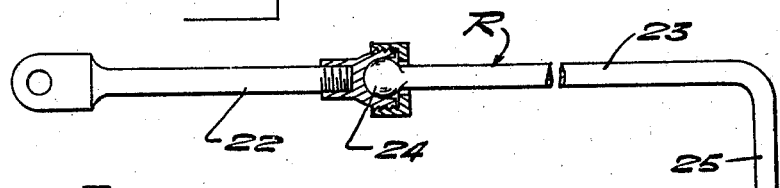
Inventor
William A. Calloway
By Watson E. Coleman.
Attorney Feb. 1, 1927.
W. A. CALLOWAY
1,616,110
OPERATING MECHANISM FOR BLEED COCKS
Filed June 10, 1926   2 Sheets-Sheet 2
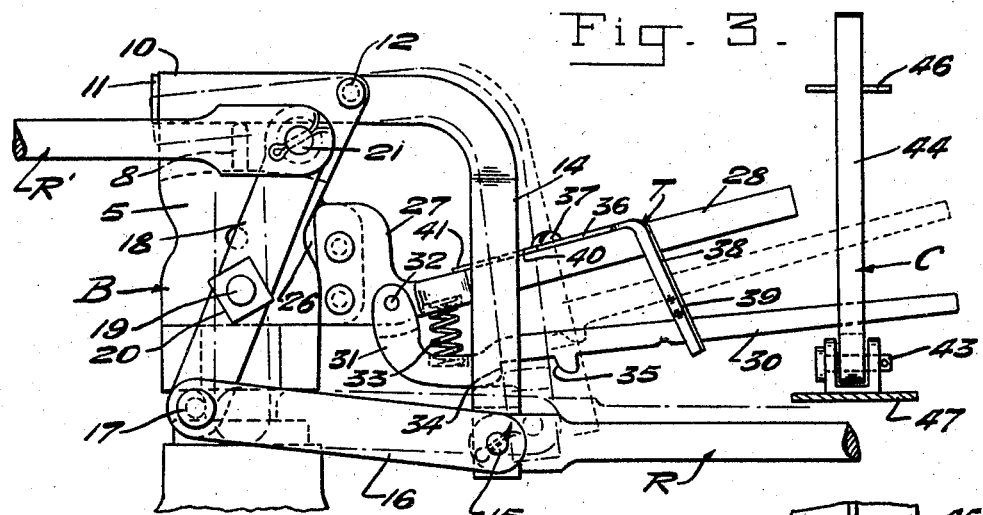
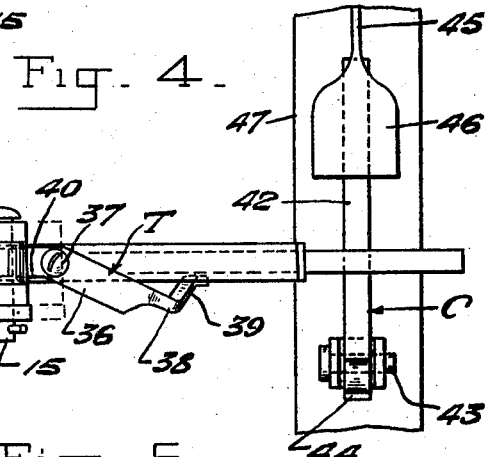
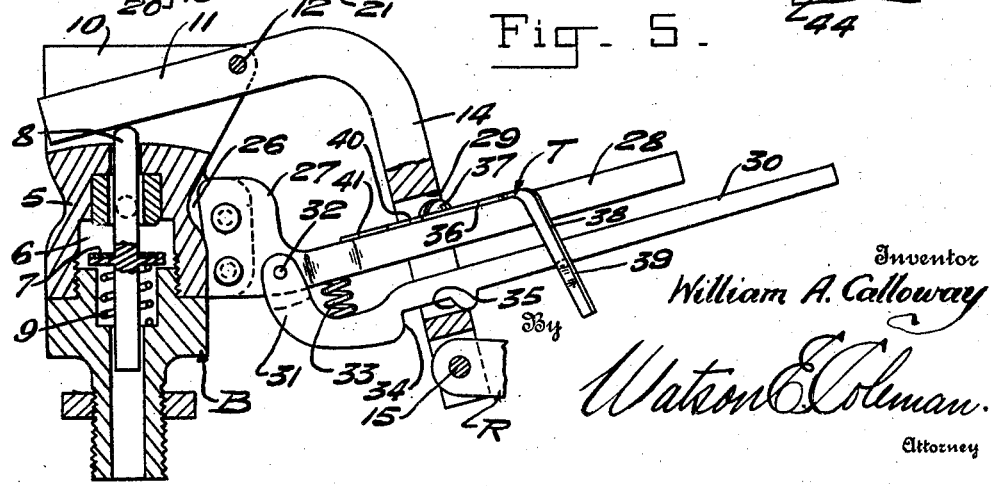
Inventor
William A. Calloway
By Watson E. Coleman.
Attorney Patented Feb. 1, 1927.

1,616,110

UNITED STATES PATENT OFFICE.

WILLIAM A. CALLOWAY, OF ROANOKE, VIRGINIA.

OPERATING MECHANISM FOR BLEED COCKS.

Application filed June 10, 1926. Serial No. 115,088.

This invention relates to an operating mechanism for a bleed cock and it is an object of the invention to provide means whereby the bleed cock or release valve associated with the auxiliary reservoir of an air brake mechanism may be readily adjusted to and maintained in open position in a manner avoiding the necessity of a trainman holding open such cock or valve to effect the desired release of rolling stock as is required in yards or other locations.

Another object of the invention is to provide means whereby the bleed cock or release valve associated with an auxiliary reservoir of a brake mechanism is maintained in open or release position after said valve has been manually opened, the requisite manual operation for opening the valve being effected by pull in a direction away from the rolling stock, similar pull being also employed to release the mechanism to permit the bleed cock or release valve to close.

An additional object of the invention is to provide a mechanism whereby the bleed cock or release valve may be manually adjusted into open position together with means for holding or locking the cock or valve in such open or released position and wherein means is provided to automatically release such holding or locking means to permit the bleed cock or release valve to return to its normal or closed position.

The invention consists in the details of construction and in the combination and arrangement of the several parts of my improved operating mechanism for a bleed cock whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in plan and partly in section and of a diagrammatic character illustrating an operating mechanism constructed in accordance with an embodiment of my invention;

Figure 2 is a view partly in side elevation and partly in section and also of a diagrammatic character illustrating certain details of the mechanism as herein embodied;

Figure 3 is an enlarged fragmentary view partly in section and partly in elevation illustrating in detail the mechanism directly associated with the bleed cock or release valve, further positions of certain of the parts being indicated by broken lines;

Figure 4 is a view in top plan of the structure illustrated in Figure 3;

Figure 5 is a view partly in section and partly in elevation of the mechanism directly associated with the bleed cock or release valve;

Figure 6 is a view in elevation with a portion in section of one of the pull rods herein disclosed;

Figure 7 is a fragmentary view in perspective of the pivoted end portion of the trigger as herein embodied.

As disclosed in the accompanying drawings, 1 denotes a brake cylinder coacting in a well known manner with the auxiliary reservoir 2, and 3 denotes the piston working in the cylinder 2.

Coacting in a conventional manner with the piston 3 is a spring 4 of a tension to move the piston 3 in a direction to release the brakes upon release of the air within the reservoir 2. As is believed to be clearly understood, the outward movement of the piston 3 to set the brakes is accomplished by air pressure created in the reservoir 2.

To release the pressure in the reservoir 2 there is provided a release valve or bleed cock B of a conventional type and which, as herein disclosed, comprises a valve casing or housing 5 providing an internal seat 6 with which is normally engaged a valve 7. The valve 7 is carried by a rod 8 and the valve 7 is normally maintained closed by the spring 9 surrounding the lower portion of the rod 8 and interposed between the valve 7 and the lower wall of the casing or housing 5. The rod 8 is of a length to have its outer portion at all times extending beyond the outer end of the casing or housing 5.

The outer end of the casing or housing 5 carries spaced flanges 10 between which is disposed an operating arm or lever 11, said arm or lever being supported by said flanges 11 through the medium of the pin 12 for swinging or rocking movement. The pivoted portion of the arm or lever 11 is continued by an angularly disposed extension arm 14 substantially at right angles to the arm or lever 11, said arm 14 being disposed in a direction inwardly of the casing or housing 5 or toward the reservoir 2 to which said casing or housing 5 is applied.

Pivotally connected with the outer or free end portion of the arm 14, as at 15, is an end portion of a pull rod R extending laterally of the body of the car or rolling stock with which the cylinder 1 and reservoir 2 are associated and terminating in close proximity to the side thereof, as is indicated in Figure 1, the side walls of the car or rolling stock in such figure being diagrammatically indicated by broken lines. The outer or free extremity of the arm 14 also has pivotally connected therewith at 15 an extremity of a rigid link 16 the opposite end portion of which being pivotally connected, as at 17, with the inner end portion of a rock lever 18. This lever 18 is mounted for rocking movement substantially midway its ends upon an outstanding pin 19 carried by the valve casing or housing 5 and held against displacement by a nut 20 or the like engaged with such pin 19 outwardly of the lever 18. The opposite or outer end portion of the lever 18 has pivotally engaged therewith, as at 21, the inner end portion of a second pull rod R'. This rod R' also extends laterally of the body of the car or rolling stock but in a direction opposite to the rod R hereinbefore referred to and terminates immediately adjacent to the opposite side of the car body.

The pull rods R and R' are of duplicate construction and as is particularly illustrated in Figure 6, it is to be noted that each of said rods consists of two sections 22 and 23, each of said sections being of desired length and having their adjacent or opposed end portions connected or coupled through the medium of a ball and socket joint 24 or its equivalent. The outer end portion of the section 23 is provided with a lateral extension to provide a hand grasp 25.

It is often noticed in a train when leaving the yard the brakes fail to release on some of the cars thus causing the brakes to drag and the wheels to slide. Upon this condition being observed, a trainman or yardman while the train is in motion can readily take hold of the hand grasp 25 of either of the rods R or R' and impose the requisite pull to effect the desired action upon the release valve or bleed cock. By having the section 23 of each of the pull rods coupled to the inner section 22 by a ball and socket joint 24 or the like, this outer section 23 will readily rotate in the event the hand grasp 25 should become caught in the glove of the trainman or yardman or other of his garments and thus assuring a ready disentanglement and avoiding the liability of the employee being thrown under the moving train.

Furthermore, it is to be noted at this time that the trainman or yardman in operating the mechanism as herein disclosed does so by imposing pull on either of the rods R or R'. This also avoids the liability of such employee dropping or falling beneath the moving train which would be liable to occur if the rods R or R' accomplish their desired functions upon being pushed.

Extending laterally from the casing or housing 5 is a flange or web 26 to which is secured a head plate 27 arranged at one end of an elongated arm 28. This arm 28 is disposed on a predetermined angle of inclination toward the upper or outer end of the casing or housing 5 and is disposed through an elongated opening or slot 29 provided in the arm 14. Underlying or arranged inwardly of the arm 28 is an elongated latch arm 30 also extending through the slot or opening 29 and having its inner extremity terminating in an upwardly disposed extension 31 pivotally connected, as at 32, to the head plate 27 at substantially the junction of said plate with the arm 28. The extension 31 is of a length to permit requisite swinging movement of the latch arm 30 with respect to the arm 28 and the outer portion of the opening or slot 29.

Interposed between the inner or pivoted end portion of the latch arm 30 and the adjacent or inner end portion of the arm 28 is an expansible member 33 operating to constantly urge the latch arm 30 in a direction away from the arm 28 and in contact with the outer end wall of the opening or slot 29.

The arm 30 in its inner portion is provided with the spaced shoulders 34 and 35 adapted to receive therebetween the portion of the arm 14 at the outer end of the opening or slot 29 so that when a rod R or R' has been pulled to effect an opening of the valve 7 of the release valve or bleed cock B, the shoulder 34 will engage the inner face of the arm 14 in a manner to maintain said valve 7 in such open position.

The inner edge of the shoulder 35 is rounded so that upon further outward movement of the arm 14 said shoulder 35 will ride up upon the outer end wall of the opening or slot 29 and thereby correspondingly move the arm 30 inwardly toward the arm 28 permitting the trigger T to engage under such raised arm 30 and further elevating the same to permit the arm 14 to swing inwardly to its normal position as illustrated in Figure 3, and thus permitting the valve 7 to return to its normally closed position.

The trigger T comprises an arm 36 pivotally connected, as at 37, to the upper or outer face of the arm 28 outwardly of the arm 14 and which is disposed on an incline to extend to one side of the arm 28. The outer end of this arm 36 is continued by a downwardly or inwardly disposed arm 38 continued by the laterally inclined arm 39 providing a cam surface which, as the trigger T or more particularly the arm 36 moves inwardly with respect to the arm 28 will engage the arm 30 and impart additional lifting movement thereto and maintain the arm in such lifted position for a period sufficient to permit the arm 14 to return to its innermost or normal position without hindrance or obstruction being offered by the shoulder 34.

The pivoted end portion of the arm 36 is continued by a tail piece 40 having its outer or free extremity transversely enlarged to provide a cam edge 41 spaced from the pivot 37 a distance whereby, as the arm 14 moves inwardly and after the shoulder 34 has been received within the opening or slot 29, the contact of the arm 14 with this cam edge 41 will swing the arm 36 outwardly to free the cam arm 39 from the arm 30. When the arm 14 is swung outwardly to effect a release of the shoulder 34 from the arm 14, said arm 14 will contact with the arm 36 resulting in the cam arm 39 having proper engagement with the arm 30 to further lift the same and to maintain the same in such lifted position for the proper period of time. It is to be stated at this time that this releasing pull upon the arm 14 is sufficient to cause the pivot 37 to be received within the opening or slot 29 to an extent sufficient to assure the requisite movement of the trigger T. This inner position of the pivot 37 is clearly illustrated in Figure 5 of the accompanying drawings.

The outer end portion of the arm 30 overlies a substantially horizontally disposed lower arm 42 of a bell crank lever C the heel portion of which being pivotally supported, as at 43, whereby said arm 42 may have swinging movement in a vertical direction or toward or from the arm 30. The second arm 44 of the lever C is vertically disposed and intersects the plane or path of travel of an elongated rod 45 which, upon movement toward the arm 44, is adapted to contact therewith to effect upward swinging movement of the arm 42 to bring the same in contact with the arm 30 to effect a release thereof when the valve 7 is in open position, so that said valve 7 may return to its normal or closed position.

The extremity of the rod 45 contacting with the arm 44 is transversely enlarged, as at 46, to facilitate such contact. The pivotal mounting 43 may be positioned as desired or preferred but, as herein disclosed, it is positioned upon a bridge 47 carried by the reservoir 2. This bridge piece or its equivalent, however, may be of any kind or type and supported or mounted as the requirements of practice may best prefer.

The rod 45 is connected, as at 48, to a bracket 49 operatively connected with the piston 3 and preferably clamped directly to the piston rod 3ª. This bracket 49 is so positioned and the rod 45 is of such length that when the piston 3 is in released position the rod 45 is free of the arm 44 of the lever C but, as the piston 3 moves inwardly and just before reaching the limit of such movement, said rod 45, or more particularly the enlarged portion 46 thereof, will come in contact with the arm 44 to effect the release, as hereinbefore referred to, of the arm 30 to permit the valve 7 to return to its normal or closed position. This automatic release is made as it assures the proper closing of the valve 7 after the reservoir 2 has been properly relieved or bleeded without the necessity of a trainman manually effecting the requisite release. In the event, however, this automatic operation should not be accomplished and with reasonable promptness and before the train is in transit, when this fact is determined which will be readily noted by the locking of the wheels of the car, a yardman or other employee can readily impose the requisite pull upon a rod R or R' as hereinbefore referred to.

It is also to be understood that slight pull can be imposed upon a rod R or R' to determine whether or not there is sufficient air in the system of the car.

At this time it is to be particularly emphasized that the construction and operation of the mechanism herein embodied are of such a character as to assure safety and especially to the employee operating the mechanism and more especially when a car or train is in motion.

The mechanism as herein disclosed is also of especial importance in bleeding air off of a train that has been charged with air from a stationary air plug or by an engine as is often done in yards after a train has been made up and it is desired to inspect the train to determine whether the cars are in proper condition to continue on the trip. Under these conditions, as is believed to be understood, the locomotive is not attached. With an operating mechanism such as the present invention on each of the cars so inspected, it will only be required that a requisite employee walk the length of the train and manually set the bleed cocks on such cars that need to be bled off.

From the foregoing description it is thought to be obvious that an operating mechanism for a bleed cock constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with the bleed cock of an auxiliary reservoir of an air brake mechanism, means operating upon pull for opening said cock, and means operating upon further pull for maintaining the cock in open position.

2. In combination with the bleed cock of an auxiliary reservoir of an air brake mechanism, means operating upon pull for opening said cock, means operating upon further pull for maintaining the cock in open position, and means operating upon still further pull to release said holding means to permit the cock to close.

3. In combination with the bleed cock of an auxiliary reservoir of an air brake mechanism, means operating upon pull for opening said cock, means operating upon further pull for maintaining the cock in open position, means operating upon still further pull to release said holding means to permit the cock to close, and additional means operating independently of the pulling means to release the locking means.

4. In combination with the bleed cock of an auxiliary reservoir of an air brake mechanism, means operating upon pull for opening said cock, means operating upon further pull for maintaining the cock in open position, means operating upon still further pull to release said holding means to permit the cock to close, additional means operating independently of the pulling means to release the locking means, said last named means operating automatically under the action of the usual piston of the brake mechanism associated with the auxiliary reservoir.

5. In combination with a bleed cock including a casing and a normally closed valve having a rod extending exteriorly of the casing, a lever supported for swinging movement and contacting with the rod when swung in one direction to move the valve into open position, an arm extending from the pivoted end portion of the lever, means operating on pull in opposite directions respectively for swinging the arm and simultaneously swinging the lever into contact with the rod of the valve, and means engaging said arm for holding the arm and lever against movement when the valve is in open position.

6. In combination with a bleed cock including a casing and a normally closed valve having a rod extending exteriorly of the casing, a lever supported for swinging movement and contacting with the rod when swung in one direction to move the valve into open position, an arm extending from the pivoted end portion of the lever, means for imposing pull upon the arm to swing the lever into contact with the rod of the valve, means engaging said arm for holding the arm and lever against movement when the valve is in open position, and means operating upon further pull on the arm to release said holding means.

7. In combination with a bleed cock including a casing and a normally closed valve having a rod extending exteriorly of the casing, a lever supported for swinging movement and contacting with the rod when swung in one direction to move the valve into open position, an arm extending from the pivoted end portion of the lever, said arm having an opening therethrough, a second arm supported with respect to the casing and extending through the opening in the first named arm, a third arm pivotally connected with the second named arm inwardly of the first named arm, said last named arm also extending through the opening in the first named arm, yieldable means for urging the last named arm in a direction away from the second named arm, said last named arm having spaced shoulders to receive and engage therebetween the first named arm when pulled a distance sufficient to move the valve into open position, one of said shoulders contacting with the first named arm to hold the valve in such open position.

8. In combination with a bleed cock including a casing and a normally closed valve having a rod extending exteriorly of the casing, a lever supported for swinging movement and contacting with the rod when swung in one direction to move the valve into open position, an arm extending from the pivoted end portion of the lever, said arm having an opening therethrough, a second arm supported with respect to the casing and extending through the opening in the first named arm, a third arm pivotally connected with the second named arm inwardly of the first named arm, said last named arm also extending through the opening in the first named arm, yieldable means for urging the last named arm in a direction away from the second named arm, said last named arm having spaced shoulders to receive and engage therebetween the first named arm when pulled a distance sufficient to move the valve into open position, one of said shoulders contacting with the first named arm to hold the valve in such open position, the second shoulder constituting a lifting element engaging the first named arm when further pull is imposed thereon to lift the first shoulder out of locking engagement with the first named arm.

9. In combination with a bleed cock including a casing and a normally closed valve having a rod extending exteriorly of the casing, a lever supported for swinging movement and contacting with the rod when swung in one direction to move the valve into open position, an arm extending from the pivoted end portion of the lever, said arm having an opening therethrough, a second arm supported with respect to the casing and extending through the opening in the first named arm, a third arm pivotally connected with the second named arm inwardly of the first named arm, said last named arm also extending through the opening in the first named arm, yieldable means for urging the last named arm in a direction away from the second named arm, said last named arm having spaced shoulders to receive and engage therebetween the first named arm when pulled a distance sufficient to move the valve into open position, one of said shoulders contacting with the first named arm to hold the valve in such open position, the second shoulder constituting a lifting element engaging the first named arm when further pull is imposed thereon to lift the first shoulder out of locking engagement with the first named arm, and means carried by the second named arm and coacting with the first named arm to further lift the third arm after an initial raising of the third arm by the lifting shoulder.

10. In combination with a bleed cock including a casing and a normally closed valve having a rod extending exteriorly of the casing, a lever supported for swinging movement and contacting with the rod when swung in one direction to move the valve into open position, an arm extending from the pivoted end portion of the lever, said arm having an opening therethrough, a second arm supported with respect to the casing and extending through the opening in the first named arm, a third arm pivotally connected with the second named arm inwardly of the first named arm, said last named arm also extending through the opening in the first named arm, yieldable means for urging the last named arm in a direction away from the second named arm, said last named arm having spaced shoulders to receive and engage therebetween the first named arm when pulled a distance sufficient to move the valve into open position, one of said shoulders contacting with the first named arm to hold the valve in such open position, the second shoulder constituting a lifting element engaging the first named arm when further pull is imposed thereon to lift the first shoulder out of locking engagement with the first named arm, and means carried by the second named arm and coacting with the first named arm to further lift the third arm after an initial raising of the third arm by the lifting shoulder, said coacting means also holding the third arm against opposite movement until the holding shoulder of the third arm has entered the opening in the first arm.

11. In combination with a bleed cock including a casing and a normally closed valve having a rod extending exteriorly of the casing, a lever supported for swinging movement and contacting with the rod when swung in one direction to move the valve into open position, an arm extending from the pivoted end portion of the lever, said arm having an opening therethrough, a second arm supported with respect to the casing and extending through the opening in the first named arm, a third arm pivotally connected with the second named arm inwardly of the first named arm, said last named arm also extending through the opening in the first named arm, yieldable means for urging the last named arm in a direction away from the second named arm, said last named arm having spaced shoulders to receive and engage therebetween the first named arm when pulled a distance sufficient to move the valve into open position, one of said shoulders contacting with the first named arm to hold the valve in such open position, the second shoulder constituting a lifting element engaging the first named arm when further pull is imposed thereon to lift the first shoulder out of locking engagement with the first named arm, and means carried by the second named arm and coacting with the first named arm to further lift the third arm after an initial raising of the third arm by the lifting shoulder, said coacting means also holding the third arm against opposite movement until the holding shoulder of the third arm has entered the opening in the first arm, said coacting means also becoming operative after the holding shoulder of the third arm has passed within the opening of the first arm.

In testimony whereof I hereunto affix my signature.

WILLIAM A. CALLOWAY.